United States Patent [19]

Tomantschger et al.

[11] Patent Number: 5,108,852
[45] Date of Patent: Apr. 28, 1992

[54] MANGANESE DIOXIDE CATHODE FOR A RECHARGEABLE ALKALINE CELL, AND CELL CONTAINING THE SAME

[75] Inventors: Klaus Tomantschger; Christopher Michalowski, both of Mississauga, Canada

[73] Assignee: Battery Technologies Inc., Mississauga, Canada

[21] Appl. No.: 497,908

[22] Filed: Mar. 23, 1990

[51] Int. Cl.$^5$ .................. H07M 2/14; H07M 4/62
[52] U.S. Cl. ............................ 429/66; 429/164; 429/215; 429/232
[58] Field of Search ............... 429/66, 164, 224, 214, 429/215, 232

[56] References Cited

U.S. PATENT DOCUMENTS

| | | | |
|---|---|---|---|
| 2,960,558 | 11/1960 | Marsal et al. | 429/63 |
| 4,091,178 | 5/1978 | Kordesch | 429/224 X |
| 4,129,686 | 12/1978 | Kaduboski | 429/66 X |
| 4,340,653 | 7/1982 | Adams | 429/224 X |
| 4,629,665 | 12/1986 | Matsuo | 429/164 |
| 4,891,282 | 1/1990 | Nagaura et al. | 429/224 X |

OTHER PUBLICATIONS

Shinoda, *Patent Abstracts of Japan* vol. 11, No. 237, (E-528) p. 145 (Kokai 62/51164) Mar. 1987.

*Primary Examiner*—Stephen Kalafut
*Attorney, Agent, or Firm*—Donald E. Hewson

[57] ABSTRACT

This invention relates to rechargeable manganese dioxide cells (usually alkaline cells with zinc anodes or cells having non-aqueous electrolyte and lithium anodes), and particularly to the cathodes therefor. In keeping with the present invention, the cathodes are essentially unconstrained—that is, no cage is used in the cell between the cathodes and the anodes. The cathode is restricted from significantly changing its dimensions during discharge of the cell, when it is inclined to swell—as opposed to the tendency of the cathode to contract during a charge cycle. The cathode substantially fills the entire space alloted for it within the cell, with a slight accommodation for height-wise or longitudinal expansion or growth of the cathode of bobbin-type cells, or cross-wise expansion or growth of button-type cells. There may be additives in the cathode mix, including particularly conductive fibres of graphite or other conductive materials; and other materials may also be added to the cathode mix, including metallic additives. Methods of manufacture are also provided by the present invention, including compaction and recompaction of the cathode pellet, and a range of compaction pressure is suggested. Cells in keeping with the present invention are capable of exhibiting high current drain rates, and long cycle life.

23 Claims, 1 Drawing Sheet

MANGANESE DIOXIDE CATHODE FOR A RECHARGEABLE ALKALINE CELL, AND CELL CONTAINING THE SAME

FIELD OF THE INVENTION

This invention relates to rechargeable alkaline cells having manganese dioxide cathodes. Generally, the cells in keeping with the invention, and for which specific examples are given, are alkaline manganese dioxide-zinc cells; however, other cell systems are contemplated which are cells having alkaline electrolytes and manganese dioxide cathodes, and having anodes such as hydrogen, iron, cadmium, mercury, lead, or bismuth. Indeed, the present invention also is relevant to cells having lithium anodes, manganese dioxide cathodes, and a non-aqueous electrolyte.

What the present invention particularly provides is a cell having an unconstrained rechargeable alkaline manganese dioxide cathode. By "unconstrained", it is meant that unlike many prior art patents, there is no additional wire screen or "cage" which is provided to specifically mechanically constrain the cathode from growing due to the tendency of manganese dioxide cathodes to swell during a discharge cycle. The cells in keeping with the present invention may exhibit high drain rate capabilities, as well as long cycle life.

BACKGROUND OF THE INVENTION

It must always be recognized that when the cells having rechargeable manganese dioxide cathodes, with zinc or other anodes as discussed above and noted hereafter, are assembled in their fully charged state. That is to way, the first cycle to which any such ell is subjected to, in use, is a discharge cycle, after which the cell is required to be re-charged for subsequent use. This is, of course, in contradistinction to nickel cadmium (Ni-Cd) cells, which must first be charged before they are capable of being used.

Because any cell in keeping with the present invention—whether a bobbin cell, or a coin or button cell—is subjected to discharge when it is first put into use, and because manganese dioxide cathodes (especially, in the presence of an alkaline electrolyte) have a tendency to swell during discharge, care must be taken to ensure that the cathode maintains its integrity and does not disintegrate or substantially swell in such a manner as to disturb the internal structure of the cell, thereby rendering it ineffective for further use. That, of course, is what happens or may happen generally if primary alkaline manganese dioxide-zinc cells are subjected to a charge cycle following discharge.

Generally, for cells in keeping with the present invention, the manganese dioxide cathode—which is specifically the subject of the present invention and which is discussed in greater detail hereafter—is provided together with an anode, a separator, and an electrolyte, all in ah suitable container, and sealed therein by a suitable closure. In general, the electrolyte is 6 N KOH to 12 N KOH. The anolyte—which is essentially electrolyte which is used for formulating the anode —is generally also 6 N KOH to 12 N KOH, but may have zinc oxide dissolved in it in an attempt to reduce corrosion of the zinc metal of the anode, and so as to provide an overcharge reserve for the cell.

The separator which is used between the cathode and the anode is generally a cellulose, non-woven material, which may optionally have a fibre structure in it or associated with it for re-inforcement.

When the anode is zinc, it is generally a zinc powder mixed with a gelling agent which may be such as NaCMC. Corrosion inhibitors such as mercury, lead, cadmium, indium, gallium, and thallium, may also be included in the anode formulation, in an attempt to reduce hydrogen gassing within the cell.

For a more complete understanding of the present invention, some discussion follows with respect to the characteristics of a zinc anode—as being the most typical anode used in commercial cells embodying a manganese dioxide cathode—and with respect to certain characteristics of manganese dioxide when used as a cathode.

First, having regard to a zinc anode as discussed above, it is noted that during the first few cycles of the rechargeable cell, a certain portion of the active zinc mass may become inactive. Typically, a gelled cylindrical anode has a central current collector (the nail) placed down its centre, particularly in such as cylindrical or bobbin-type rechargeable manganese-zinc cells, and the anode may have in the order of 50%–70% by weight (amalgamated) of zinc powder. Electrical conductivity within the gelled anode is established through the contact of the individual metallic zinc particles within the anode (the so-called zinc chain). However, as discharge of the cell proceeds, the highly conductive zinc particles are oxidized to become non-conductive ZnO or Zn(OH)2, each of which is a solid. Later, the zinc oxide or zinc hydroxide may dissolve to form zincate ions. However, after the electrolyte in the neighbourhood of the metallic zinc particles is locally saturated with zincate the compounds no longer dissolve and the discharge reaction will stop due to passivation of the anode. (This is particularly discussed in Falk and Salkind, "Alkaline Storage Batteries", published by John Wiley & Sons, 1969, at pages 156–159.)

When the cell is recharged, zinc is replated in the anode, initially near the nail or current collector, but the conductive zinc chain which originally existed can no longer be completely be re-established without a significant overcharge of the cell. The addition of conductive additives which do not participate in the discharge and charge reaction will remedy this situation, and is contemplated in a patent application assigned to the assignee herein, in the name of Kordesch, Sharma and Tomantschger, application Ser. No. 608,841 filed Nov. 5, 1990.

As to the manganese dioxide, Falk and Salkind (above) at pages 180–182, describe the discharge reaction of manganese dioxide in alkaline solution. The discharge reaction is quite complex, and may proceed in various steps. It is now generally accepted that the mechanism proposed by Kozawa best describes the discharge of manganese dioxide ("Batteries", Volume 1, Manganese Dioxide—edited by Kordesch—chapter 3). The MnO2 discharge curve has a sloping characteristic, indicating an homogeneous phase reaction. The potential of the MnO2 changes continuously while protons originating from the water of the electrolyte are introduced into the ionic lattice of the manganese dioxide, according to the equation;

MnO2+H2O+e=MnOOH+OH  (Equation 1)

However, the MnO2 lattice expands, and at a certain point during the discharge, the mechanism changes.

After that time the discharge occurs in a heterogeneous phase reaction, according to the reaction;

$$MnOOH + H_2O + e = Mn(OH)_2 + OH \quad \text{(Equation 2)}$$

This second reaction step involves the dissolusion of MnOOH in the form of $(Mn(OH)_4)$, with electrochemical reduction on the graphite in the manganese dioxide cathode to $(Mn(OH)_4)$", and the precipitation of $Mn(OH)_2$ from it.

Reference is made to a further copending application 400,712 assigned to the assignee hereof, in the name of Kordesch, Gsellmann, and Tomantschger, which discusses a practical approach to the problem of loss of capacity of manganese dioxide cathodes, now U.S. Pat. No. 5,011,752, issued Apr. 30, 1991. In that invention, it is proposed that the manganese dioxide material be pre-conditioned to have an oxidation state at the time that the cell is finally assembled and sealed between 1.7 and 1.9.

It should be noted that $MnO_2$ which has been discharged in its homogeneous phase may be recharged. However, any $Mn_3O_4$ that is formed during discharge is not capable of being recharged. The $Mn(OH)_2$ noted in equation 2 above, may be reoxidized to become $Mn_3O_4$. There is no evidence that MnOOH is to be found in a discharged manganese dioxide cathode.

The discharge of $MnO_2$ is also discussed in, for example Dzieciuch et al U.S. Pat. No. 4,451,543 where it is suggested that $MnO_2$ may be rechargeable to the two electron level. There, is was found that $MnO_2$ was reduced in an homogenous phase to $MnO1.6$, thereby forming an alpha MnOOH (groutite) having a gamma structure. Beta $MnO_2$ (chemical manganese dioxide—CMD) was only reduced homogenously to about $MnO1.96$ or $MnO1.98$.

Boden et al, J. Electrochem. Soc. 114, at 415 (1967) confirm that the discharge of EMD is an homogenous phase discharge, but they postulate an amorphous intermediate. This was because the internal resistance was found to rapidly increase with $MnO1.6$, and that it reaches a ten-fold value of $MnO_2$ at about $MnO1.4$.

Euler, In Electrochimica Acta 15, at 1233 (1970) studied commercial battery electrodes, and revealed the influence of conductivity of the cathode mix and electrolyte penetration. This is complicated, however, by the ability of $MnO_2$ cathodes to recuperate from an homogenous phase discharge. This suggests therefore, that there are potential gradients within the manganese dioxide cathode, under load conditions; and this suggests, therefore, that rechargeable $MnO_2$ electrodes may have been locally over-discharged.

One further problem that develops generally in manganese dioxide cathodes is the possible migration of the zincate from the anode to the cathode. Zincate ions can be transported to the manganese dioxide cathode and there they form a mixed oxide, hetaerolite $(ZnO.Mn_2O_3)$. The hetaerolite irreversibly affects the behaviour of a manganese dioxide cathode. It has been particularly recognized by Kordesch et al in Electrochmica Act 25 (1981) at 1495 to 1504 that the longevity of a rechargeable alkaline manganese dioxide cathode in its homogenous discharge phase above about $MnO1.55$ was limited by the mechanical failure of the electrode (cathode). It has been well shown that a manganese dioxide cathode expands during discharge and contracts during charge. Kordesch et al have shown that cycling an unconfined manganese dioxide cathode through four discharge-charge cycles resulted in the thickness of the $MnO_2$ electrode becoming more than double its original thickness, and that the electrode failed due to the bulging and the mechanical disintegration which occurred. This was notwithstanding the fact that a binder (in this case, polysulfone) was employed.

Kordesch et al also demonstrated that if a similar electrode was confined by a perforated disc, the confined electrode continues its cycling life well beyond the fourth cycle; and that the change in dimension between the charged and the discharged electrode was only about half of that which occurred in the unconfined electrode. It was demonstrated that a mounting pressure of about 250-750 $N/cm^2$ was required to increase the cycle life from less than about 5 cycles—shown, above, to be because of poor conductivity and mechanical disintegration and to achieve at least a cycle life of 75 cycles. A peak of 92 cycles was found at 500 $N/cm^2$. However, it was also found that a higher mounting pressures the cycle life would drop because of the loss of pore volume within the manganese dioxide cathode, thereby creating problems with respect to electrolyte penetration within the cathode.

When the manganese dioxide cathode is present in the form of a sleeve or a disc, additional difficulties may arise. The internal resistance of the electrode may increase, and the mechanical disintegration of the cathode may be particularly severe. Kordesch, in "Batteries, Vol. 1" at pages 201 to 219 discusses these problems. Several prior art references show attempts to preclude the expansion of a manganese dioxide cathode during discharge and, indeed, to try to prevent its contraction during charge, including such matters as the addition of a binder such as a cement (U.S. Pat. No. 2,962,540); the addition of graphitized textile fibres (U.S. Pat. No. 2,977,401); the addition of latex binders (U.S. Pat. No. 3,113,050); use of combination binders such as cement and steel wool (U.S. Pat. No. 3,335,031); and the use of supplementing binders as described in U.S. Pat. No. 3,945,847. None of those patents, however, could preclude the mechanical disintegration of the cathode, apparently due to the limited binding strength of the materials being used.

Kordesch and Gsellmann in U.S. Pat. No. 4,384,029 teach cylindrical "bobbin" cells which may use mechanical enclosures such as tubes, springs, mechanical wedges, and perforated cylinders, to preclude expansion of the cathode during discharge of those bobbin cells. What this patent attempts to do is to create a constant volume cathode, which means that the cathode must always be under a certain mounting pressure at all times. That patent suggests that by increasing the mounting pressure, the number of usable cycles for the cell will increase. By providing the metal cage, which is essentially rigid, the tendency of the cathode to swell creates internal pressure within itself, which acts against the metal cage and between the cage and the can, thereby counteracting the tendency to swell; and by maintaining the cathode under pressure, it maintains a substantially constant volume during discharge as well as charge.

A different approach, using combinations of binders with a mechanical retainer or multiple mechanical retainers is disclosed in a further patent assigned to the present assignee, in the name of Kordesch, Gsellmann and Tomantschger, being U.S. Pat. No. 4,957,8267, issued Sept. 18, 1990.

What must be recognized is that, while it is shown that the use of means particularly such as the cages of the two Kordesch et al patents noted immediately above provides for a structure having up to several hundred cycles, there are several disadvantages to be considered. Particularly, where cement or other non-conductive binders are used, they may be preset in the range of typically 5%–10% by volume of the cathode, and therefore the amount of active ingredients that can be placed in the cathode is reduced. This results in a decrease in the usable capacity of the cell, and it may also result in a decrease int he conductivity of the cathode of the cell. On the other hand, if an insufficient amount of binder content is used, typically the manganese dioxide cathode may tend to crumble and/or crack, so that a coherent electrode is not achieved and its integrity is seriously affected.

If mechanical structures such as cages or screens are employed, then there is a significant increase in the material cost of the cell, as well as a significant increase in the cost of assembly of the cell. Indeed, there may be a significant effect and complication with respect to the use of high speed production equipment. Moreover, the use of a mechanical component such as a perforated iron cage or plate may significantly increase the probability of cell gassing within the cell.

Still further, the use of the mechanical cage or screen adjacent to the separator of the cell may significantly affect the capability of the cell to operate in a high drain condition. Any mechanical means which restricts the electrode interface between the cathode and the anode will act to limit the current density achievable within the cell.

PURPOSES OF THIS INVENTION

The present inventors have found that, quite unexpectedly, the mechanical integrity of a cathode can be maintained during cycling, without the necessity for any physical confinement of the manganese dioxide cathode, and without the necessity of a binder to be present in the cathode mix. That means, therefore, that the present invention provides a cell having an unconstrained manganese dioxide cathode.

However, the present invention achieves its purpose of providing an unconstrained cathode by a variety of ways. It may achieve that purpose by restricting the cathode from significantly changing its dimensions during discharge by, essentially, filling the entire volume within the cell intended for the cathode and thereby leaving essentially no void above the cathode between the top of the cathode and the closure of the cell. The invention may also achieve its purpose by providing a cathode which may have admixed thereto a small quantity of fibres, usually conductive fibres. In yet another approach, the cathode may have admixed thereto a small amount of a metal-based additive which, surprisingly, may be zinc, zinc oxide, or zinc stearate. Various examples will be discussed hereafter, showing one or more of the above approaches.

Indeed, the present invention has shown that, although there may be changes in the dimensions of the cathode during cycling—expansion during discharge, contracting during charge, as noted above—and that while the overall size of the cathode may slowly increase as the number of cycles which the cell has been subjected increases, the present invention does provide a cathode for use in cell which exhibits at least equivalent operating characteristics, or better operating characteristics, than any of the prior art cells which employ binder materials or mechanical components as noted above.

It is determined that with an unconstrained cylindrical or sleeve-type cathode in a cylindrical or bobbin cell, and a disc cathode in a coin or button cell, the cathode structure may be subjected to a variety of forces as the cell is being cycled. Particularly during discharge, the tendency of the cathode to swell is inhibited by the metal can or container within which the cell is assembled. It appears that the tendency for the cathode of a bobbin cell to expand inwardly towards the anode is significantly reduced, which may in part be due to the sleeve geometry and due to the presence of the separator and the cylindrical anode within it. (In a coin or button cell, the tendency for the cathode to expand upwardly towards the anode appears likewise to be reduced.) What also appears to be the case as that the tendency for the manganese dioxide cathode to swell may be substantially linear in all directions; and since the cathode is significantly longer in length or higher than its thickness or the width of its annulus, the expansion of the cathode during discharge will for the most parts be longitudinal —that is the height of the cathode will increase significantly more than the width or thickness of the annulus, and the amount of that increase is in some way related to although it may be greater than the ratio of the initial condition height and width of the cathode.

However, in keeping with the present invention, there is substantially little void space within the cell can above the cathode and between it and the cell closure member, so that to all intents and purposes the cathode is restricted from significantly changing its dimensions during discharge by interference at its outer periphery, and at its bottom, with the cell can or container; and by interference at its inner periphery with the separator of the cell; and by interference at its top with the closure member for the cell.

As noted, the present invention contemplates that a further improvement to an unconstrained cathode will comprise the addition of a small amount of fibres to the cathode mix, usually but not necessarily conductive fibres as discussed hereafter. In that case, it is possible that there may be a slightly greater void space permitted within the cell; and in any event, the mechanical disintegration of the cathode is substantially precluded. Examples will be shown of cells having cycle life which has heretofore only been possible by the use of mechanical structural components such as cages, or by the use of inorganic binders such as cement, or by the use of organic binders such as PTFE; and of course the advantages of cells of the present invention are particularly the provision of greater cell capacity and the capability of the cell to operate under high discharge rate conditions—as well as decreased production costs.

As noted above, there is always the possibility of migration of zincate from the anode to the cathode in a manganese dioxide-zinc cell having an alkaline electrolyte. This results in the formation of haeterolite within the cathode, materially and irreversibly affecting the behaviour of the $MnO_2$ cathode, and its capability of being recharged. Unexpectedly, the present invention has shown that by the addition of a metal-based additive such as zinc, zinc oxide, or zinc stearate to the cathode information, the tendency of the performance characteristics of the cell to fade due to the formation of haeterolite within the cathode is significantly reduced.

BRIEF DESCRIPTION OF THE DRAWINGS

The figures which accompany the following discussion are representations of typical cells in keeping with the present invention. In this instance.

DESCRIPTION OF THE PREFERRED EMBODIMENTS

Figure 1:
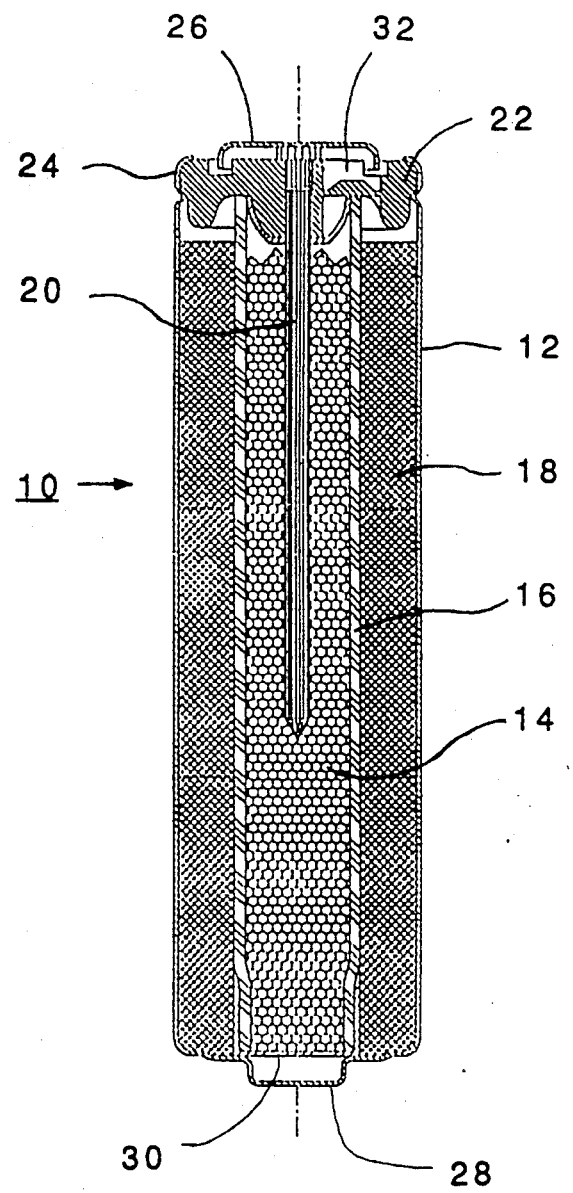
FIG. 1 shows a typical manganese dioxide-zinc cell of the present invention in the AA size.
Figure 2:
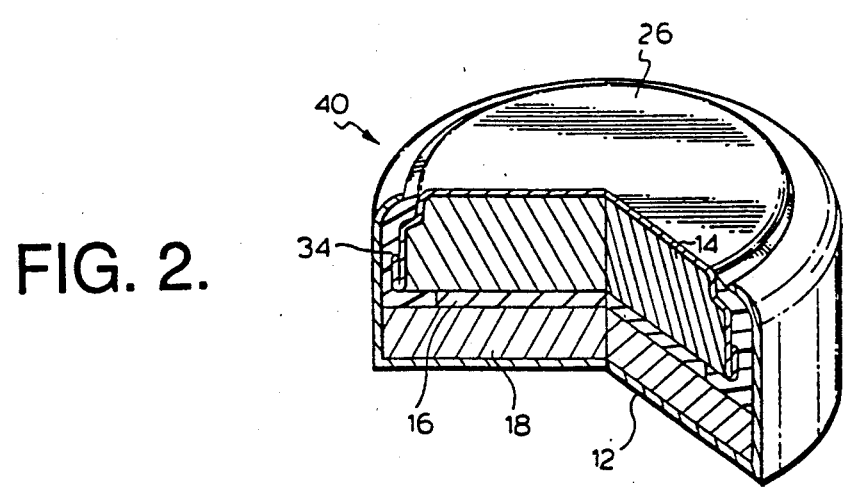
FIG. 2 shows a typical construction of a coin or button of the present invention.

First, having regard to the figures, typical cell structures for a bobbin cell 10 and coin or button cell 40 are shown. For ease of discussion, similar cell components are shown having identical reference numerals. Each cell includes a container or can 12, which may be nickel plated steel or any other convenient can of the sort generally used for the manufacture of primary or secondary cells. Within the can 12 there is an anode 14, a separator 16, and a cathode 18. Typically, the separator may be a single layer of a cellulosic, non-woven material or it may be a dual layer having a separate fibre reinforcement and an ion permeable layer.

In the bobbin cell, there is extending downwardly into the anode 14 is a nail or current collector 20, which pierces and extends through the cell closure 22, by which the cell is sealed as by crimping such as at 24. Typically, the nail or current collector is made of brass or bronze.

Each cell has a negative cap 26 associated with and in the electrical conductivity with anode 14, either directly or, in the case of the bobbin cell 10, through the nail or current collector 20. In a usual embodiment of a bobbin cell such as that shown in FIG. 1, the positive terminal is formed such as by a pip 28 formed in the can 12; an insulative washer or cup 30 is placed below the anode 14; and in the embodiment shown, the separator 16 extends down into the insulative cup 30, which protects the anode from coming into contact with the can 12.

It will also be noted in the embodiment of FIG. 1 that the separator 16 extends up to contact and interfere with the bottom surface of the closure member 22. A relief membrane 32 is shown moulded into the closure member 22, and it is intended to burst at a pre-determined pressure in the event of a significant build up of internal gas pressure within the cell.

The coin or button cell 40 uses the can 12 as its positive terminal; and it is crimped over the grommet 34 so as to insulate the positive and negative terminals of the cell from each other.

What the present invention provides, therefore, is a rechargeable electrochemical cell having a container 12, an anode 14, a separator 16, and a manganese dioxide cathode 18. There is an ion conductive electrolyte present within the cell, providing the ion transfer medium for current to flow between the cathode and the anode, and a closure member 22 or grommet 34 which is also a closure member. As noted, all of the internal components are sealed within the container.

(As discussed, the usual embodiments of the present invention contemplate the use of aqueous alkaline electrolyte. However, non-aqueous, non-alkaline electrolytes may be used in some circumstances, but within the ambit of and otherwise in keeping with the teachings of the present invention—for example, lithium cells.)

In keeping with one provision of the present invention, the cathode of a bobbin cell is restricted from significantly changing its dimensions during discharge by interference at its outer periphery and its bottom with the internal surfaces of the container 12, at its inner periphery by interference with the separator 16, and at its top by interference with the underside of the closure member 22. The cathode of a coin or button cell is likewise restricted by the container 12 and separator 16.

Usually, as noted, the anode may be zinc; but it may in certain circumstances be chosen from any one of the group consisting of zinc, hydrogen, iron, cadmium, mercury, lead, bismuth, and lithium.

In general, bobbin cells according to the present invention are cylindrical, having the cathode in the form of an annulus or a series of rings or pellets, and a cylindrical anode axially placed within the cathode. Coin or button cells have both the cathode and anode in the form of a disc or wafer.

It is usual, and will be shown in examples below, that the cathode may have certain additives admixed to its formulation. In general, from about 4% to about 8% by weight of the cathode is the alkaline electrolyte—generally 6 N KOH to 12 N KOH.

Still further, in general the cathode will contain a small amount of graphite—usually in the amount of from about 5% to about 15% by weight of the cathode—to increase the electrical conductivity characteristics thereof.

Moreover, the cathode may contain a small quantity of conductive carbon such as carbon black or other equivalent conductive carbon materials, generally in the range of from about 0.1% to about 10% or as much as 15% by weight of the cathode.

As noted above, a further formulation of the cathode according to the present invention will provide for the addition of a small quantity of fibres to the cathode. In general, those fibres are conductive, and they may be chosen from the group consisting of carbon fibres, graphite fibres, carbon fibres plated with nickel, carbon fibres plated with silver, graphite fibres plated with nickel, graphite fibres plated with silver, copper fibres plated with nickel, and copper fibres plated with silver. The fibres (which are milled carbon fibres and/or chopped carbon fibres) will generally have a length of from about 100 microns up to about 5 centimeters; and a typical fibre is CARBOFLEX (TM) provided by Ashland Carbon Fibres of Ashland, Ky. The fibres, especially conductive fibres, may typically be present in the cathode in the amount of from about 0.1% to about 5.0% by weight thereof.

In keeping with the present invention, several processes for the addition of fibres to the MnO2 cathode formulation are considered. In one instance, chemical grade MnO2 (CMD) may be precipitated in a carbon fibre slurry. In another instance, electrochemical grade MnO2 (EMD) may be prepared in an acidic electrolyte (e.g. H2SO4.MnSO4) where carbon fibres are suspended in the acidic electrolyte.

As noted above, yet a further embodiment of the present invention is for an unconstrained cathode having as an admixture thereto a small quantity of metal-based additive chosen from the group consisting of zinc, zinc oxide, and zinc stearate. Generally, that metal-based additive may be present in the amount of from about 1.0% to about 5.0% by weight of the cathode.

It is postulated that the presence of the metal-based additive without the cathode does, itself, create a specific charge or potential gradient within the cathode. This tends to repel the likelihood of zincate migration, and this in turn tends to inhibit the unwanted development of hetaerolite within the cathode. Thus, the unexpected consequence of the addition of the metal-based additive to the cathode is that, rather than effectively "poisoning" the cathode, the metal-based additive acts to repel the migration of the polluting elements that would poison the cathode.

The present invention also provides a method of preparing a cathode mix for use in a rechargeable alkaline electrochemical cell, where the cell is substantially as described above. As noted, the cell will comprise internal components which include a cathode, an anode, a separator, and an alkaline electrolyte; and those internal components are sealed within the container by a closure member.

Further, as noted, the cathode mix will generally comprise manganese dioxide, together with form about 4% to about 8% by weight thereof of the alkaline electrolyte—usually 6 N to 12 N KOH; and optionally from about 5% to about 15% by weight thereof of graphite; and optionally from about 0.1 % to about 10.0% by weight thereof of conductive carbon; and optionally from about 0.1% to about 5.0% by weight thereof of conductive fibres which may be chosen from the group consisting of carbon fibres, graphite fibres, carbon fibres plated with nickel or silver, graphite fibres plated with nickel or silver, or copper fibres plated with nickel or silver; and optionally from about 1.0% to about 5.0% by weight of the cathode of a metal-based additive which may be chosen from the group consisting of zinc, zinc oxide, and zinc stearate.

The method according to the present invention comprises the steps of:

(a) mixing the manganese dioxide and any of the optional admix components to form a uniform dry mix;
(b) adding the amount of alkaline electrolyte to be used in the cathode composition to the uniform dry mix, and continuing to blend the mix;
(c) screening the mix to remove agglomerates therefrom, and continuing to blend and screen until a uniform moist blended mix is achieved;
(d) compacting the blended mix;
(e) granulating the compacted blended mix;
(f) screening the granulated blended mix;
(g) forming cathode pellets from the screened blended mix; and
(h) placing the pellets in the appropriate cell containers for use as cathodes in the cells to be manufactured.

Typically, step (g) of forming the cathode pellets or annular sleeves is carried out at pressures ranging from about 1,000 Newtons per square cintimeter (N/cm2) to about 20,000 Newtons per square centimeter (N/cm2). The method of the present invention may optionally be followed by a further step of recompacting the cathode pellet(s), after it (they) has (have) been placed in the cell container. The recompaction is generally carried out at the same pressure or within the same pressure range noted above. One or several pellets may be used in a cathode for a bobbin cell; FIG. 1 suggests that three pellets may be used in the cell that is illustrated.

What now follows are a number of examples of various cells manufactured in keeping with the present invention, whereby various formulations of unconstrained cathodes have been provided and tested, with the results being given in each instance.

EXAMPLE 1

In this case, a cathode was provided having a small addition amount of graphite fibres and a small additional amount of zinc stearate included in the cathode formulation. A standard anode was provided, and cells were tested, as noted:

| | |
|---|---|
| Zinc | 54.4% (6% Hg amalgamated) |
| ZnO | 10.0% |
| Gelling Agent | 1.0% |
| Anolyte | 34.6% (9N KOH with 5% ZnO dissolved in it) |

The cathode composition was as follows:

| | |
|---|---|
| MnO2 | 82.43% |
| Graphite | 7.88% |
| Graphite fiber | 1.00% |
| Carbon | 0.47% |
| Electrolyte | 6.54% (9N KOH) |
| Metal-based additive | 1.68% (Ni(OH)2) |

Test results showed that the cells according to the above formulations averaged 375 cycles at a discharge of 420 mAh/day. They were discharged into 24 ohms, and showed a 14% depth of discharge of the cathode, with a 60% depth of discharge of the anode. The cells ultimately had anode failure.

EXAMPLE 2

Here, cells having the standard anode composition noted above were built, and the additives in the cathode included graphite fibre and metallic zinc. The cathode formulation was as follows:

| | |
|---|---|
| MnO2 | 82.43% |
| Graphite | 7.88% |
| Graphite Fiber | 1.00% |
| Carbon | 0.47% |
| Electrolyte | 6.54% (9N KOH) |
| Metal-based additive | 1.68% (ZN) |

The cells were tested as above in Example 1, cycling at 420 mAh per day into 24 ohms. Once again, the cells were discharged to about 14% depth of discharge of the cathode, and about 60% depth of discharge of the anode; they averaged 375 cycles; and once again the cells failed in an anode failure.

EXAMPLE 3

In this case, tests were made to determine the effect of the addition of ZnO to the cathode formulation, and a slightly different anode composition was used, all as follows:

| | |
|---|---|
| Zinc | 60.0% (6% HG amalgamated) |
| ZnO | 5.0% |
| Gelling Agent | 1.0% |
| Anolyte | 33.5% (9N KOH with 5% ZnO dissolved in it) |

The cathode composition was as follows:

| | Test | Control |
|---|---|---|
| MnO2 | 80.03% | 83.03% |
| Graphite | 9.00% | 9.00% |
| Graphite Fiber | 1.00% | 1.00% |

|  | Test | Control |
| --- | --- | --- |
| Carbon | 0.47% | 0.47% |
| Electrolyte | 6.50% (9N KOH) | 6.50% (9N KOH) |
| ZnO | 3.00% | 0 |

It will be noted that the control cells had no ZnO added to the cathode formulation; and that the test cells had 3.0% ZnO added to the formulation with that much less MnO2 content.

The cells were cycled at 500 mAh per day into 10 ohms, and showed a 19% depth of discharge of the cathode and a 67% depth of discharge of the anode. All cells failed in anode failure; however, the control cells without the ZnO additive only had a cycle life of 30 cycles, whereas the test cells had a cycle life of 75 cycles.

EXAMPLE 4

In this case, an anode composition as noted in Example 3 was used, and the cathode had no fibre or other additives but was constructed in a manner so as to substantially fill all of the space allotted to it within the container, with substantially no void space above the cathode beneath the cell closure.

| MnO2 | 81.5% |
| --- | --- |
| Graphite | 12.00% |
| Electrolyte | 6.50% (9N KOH) |

Here, the cells were cycled at 420 mAh per day into 24 ohms, and were calculated to have a 45% depth of discharge of the cathode, and a 50% depth of discharge of the anode. The cells were cycled for 400 cycles, and there was an apparent imminent cathode failure when the tests were terminated.

EXAMPLE 5

This series of tests was carried out to determine the relative amounts of in-cell gassing of cells made according to the present invention compared with cells having copper cages, either uncoated or coated with graphite. In this series of tests, the cathode formulation was identical to that of Example 4, noted above, and the anode composition was as follows:

| Zinc | 65.5% (6% Hg amalgamated) |
| --- | --- |
| Gelling Agent | 1.0% |
| Anolyte | 33.5% (9N KOH) |

Two sets of control cells were made, on having copper cages, the other having the same copper cages coated with graphite. The test cells were in keeping with the present invention, and had unconstrained cathodes—i.e., no cages.

The cells were subjected to 75 deep discharge cycles (or as noted), being discharged in each instance to 0.9 V into 3.9 Ohms. The cage cells exhibited identical electrical performance, and the gassing performance of all cells was observed.

The following were the performances noted of the caged and the test cells with unconstrained cathodes in keeping with this invention:

|  | Control (Cage) Cells | Test Cells |
| --- | --- | --- |
| Initial capacity (Ah) | 6.0 | 6.0 |
| Cycle 10 (Ah) | 3.3 | 3.3 |
| Cycle 20 (Ah) | 3.0 | 3.0 |
| Cycle 30 (Ah) | 1.0* | 2.7 |
| Failure Mode | Short | N/A |

*Two of three cells shorted at this time.

The in-cell gassing was observed, and was noted to be the lowest in the test cells in keeping with this invention; with the cage cells having coated cages being higher, and the cage cells having uncoated cages showing the highest gassing activity.

The present invention has been described above and shown in a variety of examples. It has been noted that in its widest concept, the present invention provides an unconstrained MnO2 cathode for use in rechargeable cells, and finds its widest application in rechargeable cells having aqueous alkaline electrolytes. The invention is applicable to bobbin cells and to coin or button cells; and in optional forms the cathode of the present invention may have admixed to its formulation such items as fibres (usually conductive fibres), graphite, conductive carbon, and a metal-based additive such as zinc, zinc oxide or zinc stearate.

The scope of the present invention is determined by the accompanying claims.

What we claim is:

1. A rechargeable electrochemical cell having a container, internal components comprising an anode, a separator, a manganese dioxide cathode, an ion conductive electrolyte, and a closure member;

wherein said closure member is placed over said anode, separator, cathode, and electrolyte, within said container, so as to seal said internal components within said container; and wherein said cathode is restricted from significantly changing its dimensions during cycling by interference at its outer periphery and its bottom with said container, and otherwise by interference with at least one of said separator and said closure member.

2. The rechargeable electrochemical cell of claim 1, wherein said anode is chosen from the group consisting of zinc, hydrogen, iron, cadmium, mercury, lead, bismuth, and lithium.

3. The rechargeable electrochemical cell of claim 2, wherein said node is zinc and said electrolyte is potassium hydroxide, so that said cell is a rechargeable alkaline cell.

4. The rechargeable electrochemical cell of claim 2, wherein said anode is lithium, and said electrolyte is non-aqueous.

5. The rechargeable electrochemical cell of claim 1, wherein said cell is a cylindrical bobbin-type cell and said anode and cathode are each cylindrical, and said anode is axially placed within said cathode; and wherein said cathode is restricted from significantly changing its dimensions during cycling by interference at its outer periphery and at its bottom with said container, at its inner periphery by interference with said separator, and at its top by interference with said closure member.

6. The rechargeable electrochemical cell of claim 1, wherein said cell is a button cell and said anode and cathode are each in the form of a disc, and said cathode is placed in the bottom of said container, and said anode is above said cathode with said separator therebetween; and wherein said cathode is restricted from significantly changing its dimensions during cycling by interference at its outer periphery and at its bottom with said container, and at its top by interference with said separator.

7. The rechargeable alkaline electrochemical cell of claim 3, wherein said cathode further contains a small amount of said alkaline electrolyte, in the amount of from about 4% to about 8% by weight thereof; and further contains a small amount of graphite so as to increase the electrical conductivity characteristics thereof.

8. The rechargeable electrochemical cell of claim 1, wherein said cathode further contains a small amount of graphite so as to increase the electrical conductivity characteristics thereof.

9. The rechargeable electrochemical cell of claim 8, wherein said graphite is present in the amount of from about 5% to about 15% by weight of said cathode.

10. The rechargeable electrochemical cell of claim 9, wherein said cathode further comprises an additional small quantity of conductive carbon.

11. The rechargeable electrochemical cell of claim 10, wherein said conductive carbon is carbon black, and is present in the amount of from bout 0.1% to about 10% by weight of said cathode.

12. The rechargeable electrochemical cell of claim 10, wherein said cathode further comprises an additional small quantity of fibres.

13. The rechargeable electrochemical cell of claim 12, wherein said fibres are conductive, and are chosen from the group consisting of carbon fibres, graphite fibres, carbon fibres plated with nickel, carbon fibres plated with silver, graphite fibres plated with nickel, graphite fibres plated with silver, copper fibres plated with nickel, and copper fibres plated with silver.

14. The rechargeable electrochemical cell of claim 12, wherein said fibres have a length of from about 100 microns to about 5 cm.

15. The rechargeable electrochemical cell of claim 13, wherein said conductive fibres have a length of from about 100 microns to about 5 cm.

16. The rechargeable electrochemical cell of claim 15, wherein said conductive fibres are present in the amount of from about 0.1% to about 5.0% by weight of said cathode.

17. The rechargeable electrochemical cell of claim 16, wherein said cathode further comprises an additional small quantity of a metal-based additive chosen from the group consisting of zinc, zinc oxide, and zinc stearate.

18. The rechargeable electrochemical cell of claim 17, wherein said metal-based additive is present in the amount of from about 1.0% to about 5.0% by weight of said cathode.

19. The rechargeable alkaline electrochemical cell of claim 7, wherein said potassium hydroxide has a normality of from about 6 to about 12.

20. The rechargeable electrochemical cell of claim 13, wherein said electrolyte is potassium hydroxide having a normality of from about 6 to about 12.

21. The rechargeable electrochemical cell of claim 18, wherein said electrolyte is potassium hydroxide having a normality of from about 6 to about 12.

22. The rechargeable alkaline electrochemical cell having a container, internal components comprising an anode, a separator, a manganese dioxide cathode, an alkaline electrolyte, and a closure member;

wherein said closure member is placed over said anode, separator, cathode, and electrolyte, within said container, so as to seal said internal components within said container;

wherein said cathode contains from about 4% to about 8% by weight thereof of said alkaline electrolyte, and optionally from about 5% to about 15% by weight thereof of graphite, and optionally from about 0.1% to about 10.0% by weight thereof of conductive carbon;

wherein said cathode further contains from about 0.1% to about 5.0% by weight thereof of conductive fibres chosen from the group consisting of carbon fibres, graphite fibres, carbon fibres plated with nickel, carbon fibres plated with silver, graphite fibres plated with nickel, graphite fibres plated with silver, copper fibres plated with nickel, and copper fibres plated with silver; and wherein said cathode optionally further contains from about 1.0% to about 5.0% by weight thereof of a metal-based additive chosen from the group consisting of zinc, zinc, oxide, and zinc stearate.

23. A rechargeable alkaline electrochemical cell having a container, internal components comprising an anode, a separator, a manganese dioxide cathode, an alkaline electrolyte, and a closure member;

wherein said closure member is placed over said anode, separator, cathode, and electrolyte, within said container, so as to seal with internal components within said container;

wherein said cathode contains from about 4% to about 8% by weight thereof of said alkaline electrolyte, and optionally from about 5% to about 15% by weight thereof of graphite, and optionally from about 0.1% to about 10.0% by weight thereof of conductive carbon;

wherein said cathode further contains from about 1.0% to about 5.0% by weight thereof of a metal-based additive chosen from the group consisting of zinc, zinc oxide, and zinc stearate; and wherein said cathode optionally further contains from about 0.1% to about 5.0% by weight thereof of conductive fibres chosen from the group consisting of carbon fibres, graphite fibres, carbon fibres plated with nickel, carbon fibres plated with silver, graphite fibres plated with nickel, graphite fibres plated with silver, copper fibres plated with nickel, and copper fibres plated with silver.

* * * * *

UNITED STATES PATENT AND TRADEMARK OFFICE
CERTIFICATE OF CORRECTION

PATENT NO. : 5,108,852
DATED : April 28, 1992
INVENTOR(S) : Klaus Tomantschger, et al It is certified that error appears in the above-indentified patent and that said Letters Patent is hereby corrected as shown below:

Column 12,

Claim 3, line 2, change "node" to read --anode--.

Signed and Sealed this

Fourteenth Day of September, 1993

Attest:

BRUCE LEHMAN

*Attesting Officer*       *Commissioner of Patents and Trademarks*